US011418323B2

(12) United States Patent
Syed et al.

(10) Patent No.: US 11,418,323 B2
(45) Date of Patent: Aug. 16, 2022

(54) METHOD AND SYSTEM FOR SECURING PEER NODES IN A BLOCKCHAIN NETWORK

(71) Applicant: Tata Consultancy Services Limited, Mumbai (IN)

(72) Inventors: Habeeb Basha Syed, Hyderabad (IN); Rajan Mindigal Alasingara Bhattachar, Bangalore (IN); Meena Singh Dilip Thakur, Bangalore (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 167 days.

(21) Appl. No.: 17/084,800

(22) Filed: Oct. 30, 2020

(65) Prior Publication Data

US 2021/0385065 A1 Dec. 9, 2021

(30) Foreign Application Priority Data

May 26, 2020 (IN) .............................. 202021022045

(51) Int. Cl.
*H04L 9/06* (2006.01)
*H04L 9/08* (2006.01)
(Continued)

(52) U.S. Cl.
CPC .......... *H04L 9/0637* (2013.01); *H04L 9/0643* (2013.01); *H04L 9/0869* (2013.01); *H04L 9/30* (2013.01); *H04L 9/3218* (2013.01)

(58) Field of Classification Search
None
See application file for complete search history.

(56) References Cited

U.S. PATENT DOCUMENTS

2020/0162264 A1\* 5/2020 Zamani ................. H04L 9/3247

OTHER PUBLICATIONS

Kokoris-Kogias, Eleftherios "OmniLedger: A Secure, Scale-Out, Decentralized Ledger via Sharding" [online] IACR, Oct. 2017 [ retrieved Jun. 3, 2022], Retrieved from the Internet: URL: https://eprint.iacr.org/2017/406.pdf (Year: 2017).\*

(Continued)

*Primary Examiner* — Taghi T Arani
*Assistant Examiner* — Joshua Raymond White
(74) *Attorney, Agent, or Firm* — Finnegan, Henderson, Farabow, Garrett & Dunner LLP

(57) ABSTRACT

This disclosure relates generally to method and system for securing peer nodes in a blockchain network. The proposed disclosure is a robust model providing secure, scalable and efficient sharding committee reconfiguration technique where blockchain peer nodes organize themselves into each sharding committee among a plurality of sharding committees. The disclosure includes, generating a random number directory by each peer node communicating random numbers to the reference committee through leader node in the blockchain network. The reference committee initiates to reconfigure members of each sharding committee at predefined intervals. Further, a first message packet from each peer node is received by the reference committee based on which a second message packet is generated enabling each peer node of the block chain network to join one of the sharding committee. Then, a peer node qualifier parameter is computed utilizing a sharding committee reconfiguration technique to reconfigure the members of each sharding committee.

14 Claims, 6 Drawing Sheets

(51) Int. Cl.
  *H04L 9/30*   (2006.01)
  *H04L 9/32*   (2006.01)

(56) References Cited

OTHER PUBLICATIONS

Wang, Gang et al. "SoK: Sharding on Blockchain" [online] IACR, Oct. 2019 [retrieved Jun. 3, 2022], Retrieved from the Internet: URL: https://eprint.iacr.org/2019/1178.pdf (Year: 2019).*

Yu, Guangsheng et al. "Survey: Sharding in Blockchains" [online] IEEE, Jan. 2020 [retrieved Jun. 3, 2022], Retrieved from the Internet: URL: https://ieeexplore.ieee.org/document/8954616 (Year: 2020).*

Dang, Hung et al. "Towards Scaling Blockchain Systems via Sharding" [online] National University of Singapore, Jun. 2019 [ retrieved Jun. 3, 2022], Retrieved from the Internet: URL: https://www.comp.nus.edu.sg/~hungdang/papers/sharding.pdf (Year: 2019).*

Author: Hung Dang, Tien Tuan Anh Dinh, Dumitrel Loghin Title: Towards Scaling Blockchain Systems via Sharding Title of the item: SIGMOD '19: Proceedings of the 2019 International Conference on Management of Data Date: Jun. 2019 pp. 123-140 Volume—issue Nos. Publisher: The ACM Digital Library Link: https://www.comp.nus.edu.sg/~hungdang/papers/sharding.pdf.

Author: Zuphit Fidelman Title: A Generic Sharding Scheme for Blockchain Protocols Date: Jun. 2019 p. 54 Publisher: Technion—Israel Institute of Technology Link: https://arxiv.org/ftp/arxiv/papers/1909/1909.01162.pdf.

Author: Gang Wang, ZhijieJerry Shi,Mark Nixon, Song Han Title: SoK: Sharding on Blockchain Title of the item: AFT '19: Proceedings of the 1st ACM Conference on Advances in Financial Technologies Date: Oct. 2019 pp. 41-61 Publisher: The ACM Digital Library Link: https://eprint.iacr.org/2019/1178.pdf.

* cited by examiner

200 initiating, by a reference committee (REF_CMT) implemented in a blockchain network, a broadcast message requesting each peer node among a plurality of peer nodes to generate a random number directory (rPOOL), comprising random numbers, utilizing a verifiable random number generator function (F), wherein the reference committee (REF_CMT) communicates with each peer node through a leader node (LR) elected by the reference committee (REF_CMT) — 202 initiating, by the reference committee (REF_CMT) to reconfigure members of each sharding committee among a plurality of sharding committees at predefined intervals determined by the reference committee (REF_CMT), wherein each sharding committee includes atleast one peer node as member — 204 receiving by the reference committee (REF_CMT), a first message packet (M) comprising unique identifiers corresponding to each peer node among the plurality of peer nodes through the leader node (LR) — 206 sending, by the reference committee (REF_CMT), to each peer node among the plurality of nodes a second message packet (M') as a response to the first message packet (M), wherein, the second message packet is generated by the reference committee (REF_CMT) which enables each peer node of the block chain network to join one of the sharding committee — 208

FIG.2A

METHOD AND SYSTEM FOR SECURING PEER NODES IN A BLOCKCHAIN NETWORK

PRIORITY CLAIM

The U.S. patent application claims priority under 35 U.S.C. § 119 to Indian patent application no. (202021022045), filed on May 26, 2020.

TECHNICAL FIELD

The disclosure herein generally relates to the field of blockchain network, and, more particularly, to method and system for securing peer nodes in a blockchain network.

BACKGROUND

Blockchain based solutions have become one of the most promising due to their distributed and decentralized ledgers. These ledgers enable multiple parties to maintain identical copies of databases which are append only and tamper evident. Several diverse areas such as banking, supply chain management, healthcare, and thereof are rapidly adopts blockchain based technologies. However, current blockchain solutions limits in addressing transaction specific performance challenges such as throughput, scalability, security and latency that are important to any distributed protocols. Among all the existing methods, sharding has emerged as a popular technique that can overcome both performance and scalability challenges while processing transactions. Particularly, sharding technique utilizes the concept of committees that are participating peer nodes in the blockchain network. Although, sharding technique is promising, existing solutions limits in providing secured and scalable solutions. Here, a subgroup of peer nodes verifies and commit transaction, and if any subgroup is compromised, it can have ripple effect on the entire blockchain network.

SUMMARY

Embodiments of the present disclosure present technological improvements as solutions to one or more of the above-mentioned technical problems recognized by the inventors in conventional systems. For example, in one embodiment, a system for securing peer nodes in a blockchain network is provided. The system includes a processor, an Input/output (I/O) interface and a memory coupled to the processor is capable of executing programmed instructions stored in the processor in the memory to initiate, by a reference committee (REF_CMT) in a blockchain network, a broadcast message requesting each peer node among a plurality of peer nodes to generate a random number directory (rPOOL) comprising random numbers utilizing a verifiable random number generator function (F), the reference committee (REF_CMT) communicates with each peer node through a leader node (LR) elected by the reference committee (REF_CMT). Further, the method reconfigures members of each sharding committee among a plurality of sharding committees at predefined intervals determined by the reference committee (REF_CMT), wherein each sharding committee includes atleast one peer node as member. Further, a first message packet (M) is received by the reference committee (REF_CMT), wherein the first message packet (M) includes unique identifiers corresponding to each peer node among the plurality of peer nodes through the leader node (LR). Further, the method sends by the reference committee (REF_CMT), to each peer node among the plurality of nodes, a second message packet (M') as a response to the first message packet (M), wherein, the second message packet is generated by the reference committee (REF_CMT) which enables each peer node of the block chain network to join one of the sharding committee. Each peer node among the plurality of peer nodes computes utilizing a sharding committee reconfiguration technique, a peer node qualifier parameter (y) based on a theta parameter (θ), a nonce and a hash ($PK_i$) and each peer node among the plurality of peer nodes are reconfigured as members of one of the sharding committee based on the peer node qualifier parameter (y).

In another aspect, a method for securing peer nodes in a blockchain network is provided. The method includes a processor, an Input/output (I/O) interface and a memory coupled to the processor is capable of executing programmed instructions stored in the processor in the memory for initiating, by a reference committee (REF_CMT) in a blockchain network, a broadcast message requesting each peer node among a plurality of peer nodes to generate a random number directory (rPOOL) comprising random numbers utilizing a verifiable random number generator function (F), the reference committee (REF_CMT) communicates with each peer node through a leader node (LR) elected by the reference committee ($REF_{CMT}$). Further, the method reconfigures members of each sharding committee among a plurality of sharding committees at predefined intervals determined by the reference committee (REF_CMT), wherein each sharding committee includes atleast one peer node as member. Further, a first message packet (M) is received by the reference committee (REF_CMT), wherein the first message packet (M) includes unique identifiers corresponding to each peer node among the plurality of peer nodes through the leader node (LR). Further, the method sends by the reference committee (REF_CMT), to each peer node among the plurality of nodes, a second message packet (M') as a response to the first message packet (M), wherein, the second message packet is generated by the reference committee (REF_CMT) which enables each peer node of the block chain network to join one of the sharding committee. Each peer node among the plurality of peer nodes computes utilizing a sharding committee reconfiguration technique, a peer node qualifier parameter (y) based on a theta parameter (θ), a nonce and a hash ($PK_i$) and each peer node among the plurality of peer nodes are reconfigured as members of one of the sharding committee based on the peer node qualifier parameter (y).

In yet another aspect, provides one or more non-transitory machine-readable information storage mediums comprising one or more instructions, which when executed by one or more hardware processors perform actions includes an Input/output (I/O) interface and a memory coupled to the processor is capable of executing programmed instructions stored in the processor in the memory to initiate, by a reference committee (REF_CMT) in a blockchain network, a broadcast message requesting each peer node among a plurality of peer nodes to generate a random number directory (rPOOL) comprising random numbers utilizing a verifiable random number generator function (F), the reference committee (REF_CMT) communicates with each peer node through a leader node (LR) elected by the reference committee (REF_CMT). Further, the method reconfigures members of each sharding committee among a plurality of sharding committees at predefined intervals determined by the reference committee (REF_CMT), wherein each sharding committee includes atleast one peer node as member. Further, a first message packet (M) is received by the reference committee (REF_CMT), wherein the first message packet (M) includes unique identifiers corresponding to each peer node among the plurality of peer nodes through the leader node (LR). Further, the method sends by the reference committee (REF_CMT), to each peer node among the plurality of nodes, a second message packet (M') as a response to the first message packet (M), wherein, the second message packet is generated by the reference committee (REF_CMT) which enables each peer node of the block chain network to join one of the sharding committee. Each peer node among the plurality of peer nodes computes utilizing a sharding committee reconfiguration technique, a peer node qualifier parameter (y) based on a theta parameter (θ), a nonce and a hash ($PK_i$) and each peer node among the plurality of peer nodes are reconfigured as members of one of the sharding committee based on the peer node qualifier parameter (y).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A and FIG. 2B illustrate a flow diagram of a method for securing peer nodes in a blockchain network by reconfiguring members of a sharding committee, using the system of FIG. 1, in accordance with some embodiments of the present disclosure.

DETAILED DESCRIPTION OF EMBODIMENTS

Figure 1:
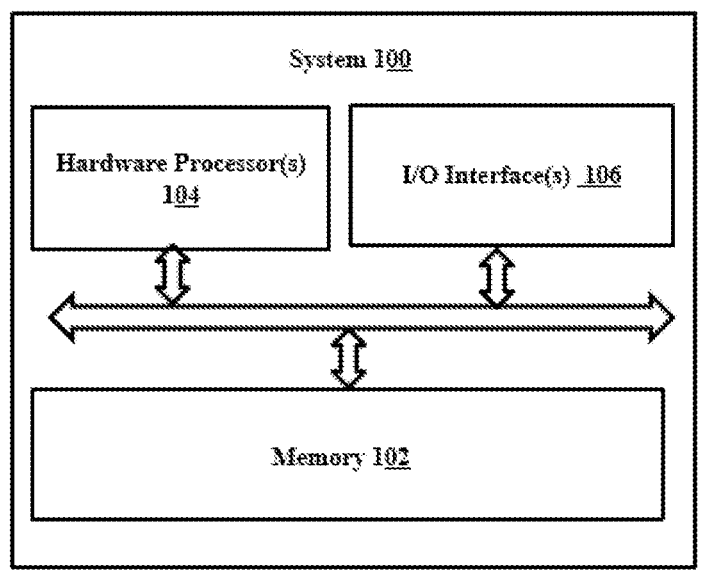
FIG. 1 illustrates a functional block diagram of a system for securing peer nodes in a blockchain network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provides a method and system for securing peer nodes in a blockchain network. The method and system disclosed, is a two-phase framework for reconfiguring sharding committee before processing any transaction in the blockchain network. Generally, blockchain sharding involves partitioning the full group of peer nodes into small subgroups referred as sharding committees. Each sharding committee is an independent blockchain to process a subset of transactions and work with other sharding committees in order to maintain a consistent view of the full blockchain state. Each sharded blockchain works in epochs where each epoch is a specific period of time which can vary from a few hours to a few weeks depending on the blockchain design. During each epoch, the following event occurs, 1. Sharding committee reconfiguration and
2. Transaction processing In any epoch it is critical to reconfigure sharding committees before transaction processing can occur. Here, an adversary is not allowed to corrupt peer nodes during the progress of each epoch. However, as sharding moves from one epoch to next epoch, an adaptive adversary (malicious node) can slowly corrupt majority of peer nodes in the committee. Hence, to prevent such attacks it is essential to keep reconfiguring the sharding committees at the end of every epoch. The process of proposed disclosure ensures that the sharding committee have been reconfigured randomly with the peer nodes without which all the subsequent process of transaction verification becomes vulnerable. The main objective of the proposed disclosure is to provide a secure and efficient method for peer nodes to reconfigure themselves into sharding committees using a two-phase framework. The proposed disclosure is a two-phase framework includes 1. generating a random number directory and 2. reconfiguring the sharding committees using a sharding committee reconfiguration technique. Here, each sharding committee consists of a subset of peer nodes selected randomly from the totality of peer nodes in the blockchain network. The proposed disclosure improves performance such as increased throughput, secured and scalable reconfiguration of sharding committees which can be implemented for securing peer nodes of various block chain networks.

Glossary

Blockchain is a distributed ledger hosted by a set of nodes referred to as peers. The ledger supports append only operations and all the peers maintain exactly same copy of ledger at any point of time. Here, $P=(P_1, P_2, P_3, \ldots P_1)$ to denote the set of peer nodes.

Blockchain Sharding is a technique in which the full set of peers is partitioned into smaller groups. This technique enables faster operations on blockchain and improves its scalability.

Reference Committee (REF_CMT)—This is a group of blockchain peer nodes that are randomly selected reference committee (REF_CMT)=$\{RC_1, RC_2, \ldots, RC_T\}$, where each $RC_i$ is a member node. This main job is to steer the process of blockchain sharding process.

Leader node (LR) in (REF_CMT): This particular node is member of $REF_{CMT}$ who acts are moderator of (REF_CMT). Such a node selection can be done by following any of well-known leader election techniques described in distributed computing literature.

Random number directory (rPOOL) is the set of random numbers generated collectively by all peer nodes in blockchain.

Hash: Cryptographically secure hash function. For example SHA256, hash ($PK_i$)=hash (public key of peer p_i).

VRF is a Verifiable Random Function (F). In blockchain peer nodes are distributed and they do not know each other. In order to generate random numbers they can use a VRF ensures that each party has generated random number in an unbiased manner. Further, with each output of a VRF, there is a mathematical proof that a third party can verify to show the output is actually random.

Network Sharding: Partitioning the group of blockchain peers into small subgroups is called network sharding and each subgroup is called a sharding committee.

State Sharding Partitioning, a blockchain state into smaller parts is referred as state sharding, where each part is called a 'shard'.

Full Sharding—This is a combination of both network sharding as well as state sharding. The number of sharding committees is same as number of shards.

Figure 5:
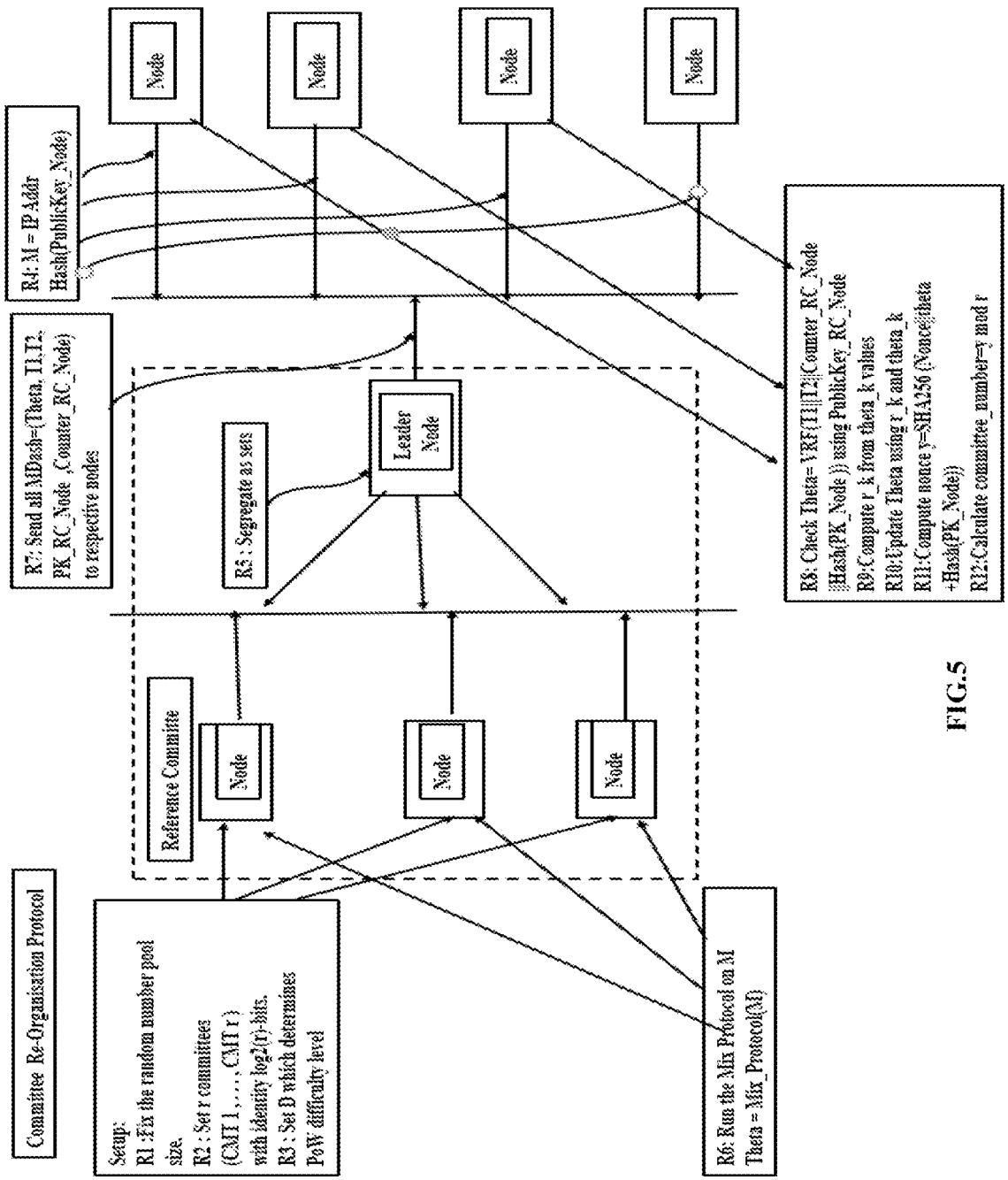
FIG. 5 illustrates an example method for reconfiguring members of each sharding committee among a plurality of sharding committees, in accordance with some embodiments of the present disclosure.

Referring now to the drawings, and more particularly to FIG. 1 and FIG. 5, where similar reference characters denote corresponding features consistently throughout the figures, there are shown preferred embodiments and these embodiments are described in the context of the following exemplary system and/or method. The system is adapted to secure peer nodes by reconfiguring members of each sharding committee in a blockchain network.

FIG. 1 illustrates a block diagram of a system (100) for securing peer nodes in a block chain network in accordance with an example embodiment. In an embodiment, the system 100 includes processor (s) 104, communication interface device(s), alternatively referred as or input/output (I/O) interface(s) 106, and one or more data storage devices or memory 102 operatively coupled to the processor (s) 104. The processor (s) 104 may be alternatively referred as one or more hardware processors or simply processor (104). In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the present subject matter is explained considering that the system 100 is implemented for securing peer nodes by reconfiguring members of each sharding committee, it may be understood that the system 100 may not be restricted to any particular machine or network environment. The system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for receiving the input request. The input request is obtained from any external source configured to any blockchain network.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may further comprise information pertaining to input(s)/output(s) of each step performed by the system 102 and methods of the present disclosure. Functions of the components of system 100 are explained in conjunction with method steps of flow diagrams depicted in FIG. 2 and use case examples. The system 100 can be implemented in any blockchain network for performing any transaction.

Figure 2B:
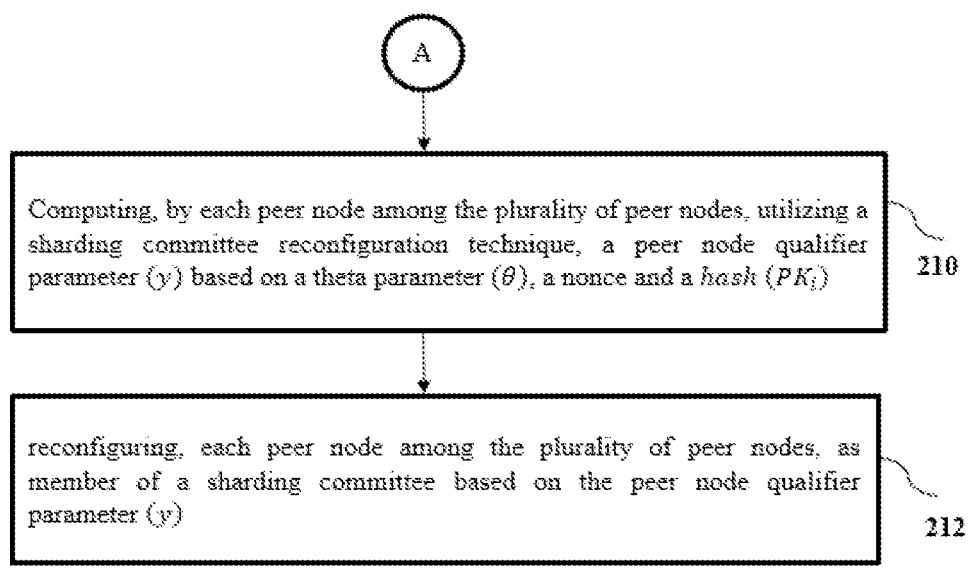

FIG. 2A and FIG. 2B illustrates a flow diagram of a method 200 for securing peer nodes in a block chain network by reconfiguring members of a sharding committee using the system of FIG. 1, in accordance with some embodiments of the present disclosure. The steps of the method 200 of the flow diagram will now be explained with reference to the components or blocks of the system 100 in conjunction with the example architecture of the system as depicted in FIG. 1 through FIG. 5. In an embodiment, the system 100 comprises one or more data storage devices or the memory 102 operatively coupled to the processor(s) 104 and is configured to store instructions for execution of steps of the method 200 by the processor(s) 104. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The system 100 configured to a plurality of peer nodes and a reference committee (REF_CMT). The reference committee (REF_CMT) selects a leader node (LR) and peer nodes as members by performing random selection. The leader node (LR) is a communication interface between each peer node and the reference committee (REF_CMT). The leader node (LR) is elected by the reference committee (REF_CMT) through random leader selection techniques which exists in the art. The system 100 receives an input request via the plurality of peer nodes. The received input request is processed by the system 100 to reconfigure the members of each sharding committee.

Figure 3:
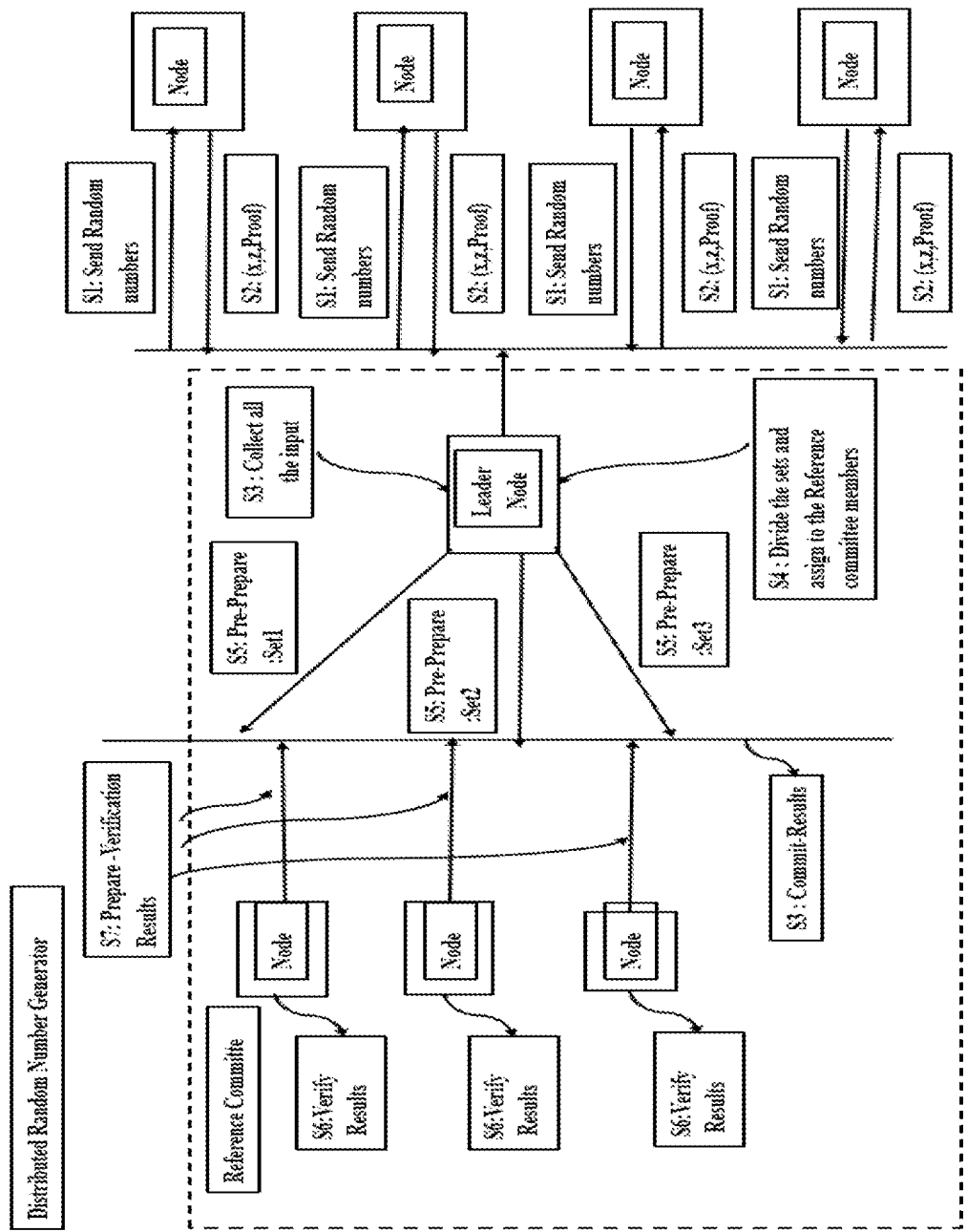
FIG. 3 illustrates a method for generating a random number directory in a blockchain network, in accordance with some embodiments of the present disclosure.

Referring now to the steps of the method 200, at step 202, the one or more hardware processors (104) are configured to initiate, by a reference committee (REF_CMT), to broadcast message requesting each peer node among a plurality of peer nodes, to generate a random number directory (rPOOL) comprising random numbers utilizing a verifiable random number generator function (F). Referring now to FIG. 3, the reference committee (REF_CMT) communicates with each peer node through the leader node (LR). Here, the reference committee (REF_CMT) is a committee of randomly selected peer nodes where majority of peer nodes are honest in the blockchain network. The random number directory resides in each peer node among the plurality of peer nodes. As a preprocessing step, the reference committee (REF_CMT) initially sends a broadcast message to each peer node among the plurality of peer nodes to generate the random number directory (rPOOL). The broadcast message is sent by the reference committee (REF_CMT) to each peer node among the plurality of peer nodes through the leader node (LR). The random number directory is a pool of random numbers generated using a verifiable random number generator function (F) and these random numbers are generated at a predetermined interval of time. The primary member of the reference committee (REF_CMT) sends a message to each peer node requesting random numbers broadcasting a time stamped along with a time bounds A indicating the end time for the reference committee (REF_CMT) to accept the message response from each peer node.

Figure 4:
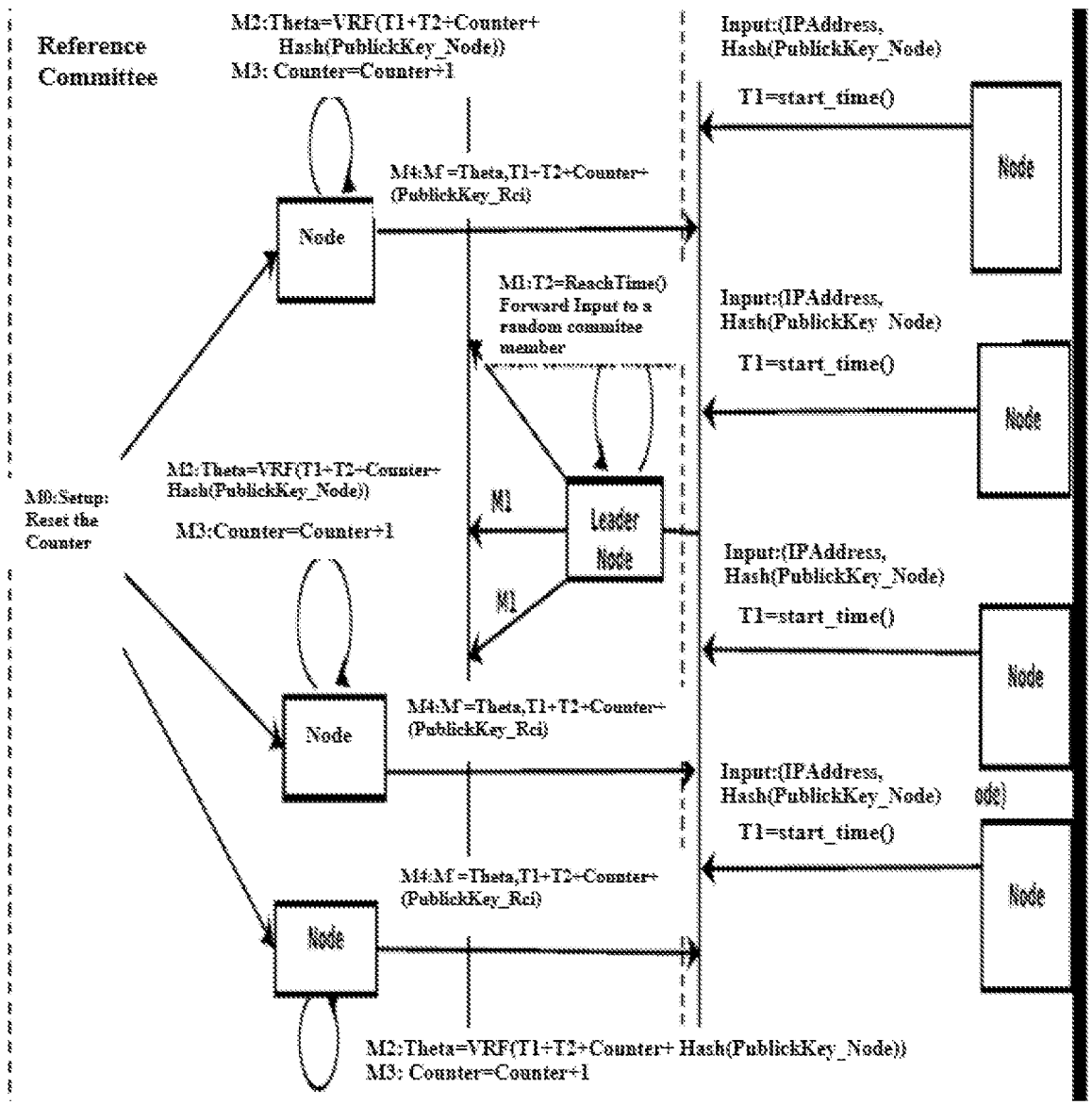
FIG. 4 illustrates a response to a first message packet generated by a reference committee (REF_CMT) in a blockchain network, in accordance with some embodiments of the present disclosure.

In order to generate the random directory (rPOOL), referring now to FIG. 4 and Table 1, the inputs required to generate the random numbers are, the reference committee (REF_CMT)={$RC_1$, $RC_2$, ..., $RC_T$}, the plurality of peer nodes, P=($P_1$, $P_2$, $P_3$, ... $P_l$), a verifiable random number function (F), and a positive integer Δ, utilized as the time bounds in seconds.

Step 1—Initially, the reference committee (REF_CMT) elects the leader node (LR) as a communication interface between each peer node P=($P_1$, $P_2$, $P_3$, ... $P_l$), and the reference committee (REF_CMT) in the blockchain network. As referred, the reference committee REF_CMT comprises randomly selected peer nodes as members.

Step 2—(LR→P), The leader node (LR) initiates a request to each peer node among the plurality of peer nodes to provide the generated random numbers. This broadcast request is time stamped which includes the specific time bound A during which the entries will be accepted.

Step 3—($P_i$→LR), The leader node (LR) receives the response for the request initiated by the leader node (LR) to generate random numbers. The response from each peer node comprises input ($x_i$), an output of the verifiable function ($z_i$) and a public key to verify the proof of the output ($\pi_i$) For every (1≤i≤l) each peer node $P_i$ among the plurality of peer nodes P=($P_1$, $P_2$, $P_3$, ... $P_l$) sends its response in the form of ($x_i$, $z_i$, $\pi_i$). The public key required for verifying the output verification is included in the 7T. In one embodiment, the verifiable random number function is a public key version of a keyed hash function. Let us assume e, e' be positive integers. A function F: $\{0,1\}^e \rightarrow \{0,1\}^{e'}$ is a verifiable random number function if for any input x∈$\{0,1\}^e$ and a public key $pk_U$, the output is F(x, $sk_U$)=(z, π), where, 'z' is a pseudorandom value, 'π' is the proof of correctness of 'z', '$pk_U$' is a cryptographic public key, '$sk_U$' is a cryptographic secret key.

Using the public key '$pk_U$', the 'π' and 'z' can be verified as the output F is evaluated at x by user using '$sk_U$'.

Step 4—The leader node (LR) collects the random number entries from each peer node which arrives within the predefine interval of time and ignores the random number entries which does not reach the leader node (LR) within the time limit.

Step 5—(LR→REF_CMT), The leader node (LR) collects the random number entries {(xi, zi, πi)} received from each peer node among the plurality of peer nodes into one set and assigns each random number entry to each member of the reference committee (REF_CMT) for verification, Step 6—(REF_CMT→LR), The leader node (LR) obtains from the members of the reference committee (REF_CMT), positively verified random number entries with valid proof.

Step 7—($z_i$: theproof$\pi_i$isvalid→REF_CMT). The positively verified random number entries are stored into the random number directory (rPOOL).

Step 8—Finally, the reference committee (REF_CMT) executes a consensus protocol Then, the said generated random number directory configured to each peer node in the system 100 are further utilized to process the input request received by each peer node from one or more external sources are described in conjunction with the embodiments as mentioned below.

TABLE 1

Generation of random number directory (rPOOL) in the blockchain network

Parties.
1. A reference committee REF_CMT with r members.
2. Blockchain peer nodes $\mathcal{P} = \{P_1, \ldots, P_l\}$.
3. A VRF denoted by F
4. A positive integer Δ that is used as time bound in seconds.

Goal. Create a collection of random numbers, rPOOL

The protocol:
S1. REF_CMT elects a leader node. The leader node is denoted by LR.
S2. (LR → $\mathcal{P}$) The leader node LR broadcasts request to all nodes to send in their random number entries. This broadcast is time stamped and includes a specific time period Δ during which the entries will be accepted.
S3. ($P_i$ → LR for every 1 ≤ i ≤ l) Each node $P_i$ sends its response in the form ($x_i$, $z_i$, $\pi_i$) where $x_i$, $z_i$ is (respectively) input and output of the F while $\pi_i$ is proof required to verify output. We assume that the public key required for output verification is included in $\pi_i$.
S4. The LR collects entries arriving within specified time period Δ and then ignores those which arrive late.
S5. (LR → REF_CMT) The LR broadcast each entry {($x_i$, $z_i$, $\pi_i$)} to all members in REF_CMT for verification.
S6. (REF_CMT → LR) Each member of REF_CMT returns those entries which are positively verified.
S7. Set rPOOL ← ($z_i$ : the proof $\pi_i$ is valid). Note that this is an ordered set and all members of REF_CMT have same view of rPOOL.
S8. Finally REF_CMT runs consensus protocol (of the underlying Blockchain) to finalize and commit the set rPOOL to Blockchain.

At step 204 of the method 200, the processor 104 is configured to initiate, action via the one or more hardware processors by the reference committee (REF_CMT) to reconfigure members of each sharding committee among a plurality of sharding committees at predefined intervals determined by the reference committee (REF_CMT), wherein each sharding committee includes atleast one peer node as member. The predefined interval of time is defined based on the on the security parameter of the corresponding blockchain network. Considering an example, where one peer node among the plurality of peer nodes receives the input request from one or more external sources. The blockchain network P=($P_1$, $P_2$, $P_3$, ... $P_l$) having the plurality of peer nodes and SHARD_CMT=($CMT_1$, $CMT_2$, $CMT_3$, ... $CMT_r$) are the plurality of sharding committees that are set to be reconfigured to process any transaction. Here, each sharding committee CMT has to be reconfigured partitioning with the plurality of blockchain peer nodes $P=(P_1, P_2, P_3, \ldots P_l)$ into sharding committees $CMT_r$, subject to the following conditions, 1. For every i,j such that $1 \leq i \leq l$ and $1 \leq j \leq r$ the probability that $P_i$ goes to $CMT_j$ which are equally and likely.
2. The method must be efficient in transferring communication and computation overheads required to $P_i$ executing the sharding committee reconfiguration technique.
3. The method can scale up if the number of $P_i$ peer nodes increases.

Once the system 100 is ready with preprocessed step and generates the random number directory, then at the end of each epoch the process of sharding committee reconfiguration is started by REF_CMT=$\{RC_1, RC_2, \ldots, RC_T\}$ by broadcasting a message to all peer nodes available in the blockchain network. Referring now to the steps of the method 200, at step 206, the one or more hardware processors (104) are configured to receive, by the reference committee (REF_CMT), a first message packet (M), which includes unique identifiers corresponding to each peer node among the plurality of peer nodes, wherein first message packet is received through the leader node (LR). Once the above input request is obtained by each peer node, the peer node triggers to generate the first message packet (M). The unique identifiers comprising an IP address and the hash ($PK_i$). However, these identifiers are not limited to extracted inputs from each peer node and may vary based on each peer node configuration. In one embodiment, once the random number directory (rPOOL) is generated, the blockchain peer nodes starts the process of each sharding committee reconfiguration. The sharding committee reconfiguration technique disclosed herein is interactive and runs between each peer node and the reference committee (REF_CMT) with the objective of enabling each peer node to choose a small set of random numbers from the random number directory (rPOOL) securely of the corresponding peer node.

Referring now to FIG. 4, to generate a response to the first message packet (M), at step 208 of the method 200, the processor 104 is configured to send, by the reference committee (REF_CMT), to each peer node among the plurality of nodes, a second message packet (M') as a response to the first message packet (M). The second message packet is generated by the reference committee (REF_CMT), which enables each peer node of the block chain network to join one of the sharding committee. In one embodiment, referring the above example the peer node $P_i$ sends the first message packet (M) as represented below in equation 1, $$(M)=(\text{IP address of } P, \text{hash}(PK_p)) \quad (1)$$

to the reference committee (REF_CMT) through the leader node (LR). As an initial setup the below mentioned steps are configured in the blockchain network, 1. The size of the random number directory is fixed at the beginning of each run of epoch configuration.
2. The plurality of sharding committees, $$\text{SHARD\_CMT}=(CMT_1, CMT_2, CMT_3 \ldots CMT_{(r-1)})$$

among each sharding committee is identified using a logarithmic value integer $\log_2(r)$ bit integer. There are r sharding committees each one identified by an integer 0, 1, ..., r-1. The identities of each sharding committee remains fixed over time.

3. The positive integer D determines peer node qualifier difficulty level which varies and is determined by the reference committee (REF_CMT) depending on sybil threat perception.
4. The positive integer $\delta > 1$
5. $\beta = \log 2 (|rPOOL|) = $ number of bits in $(|rPOOL|)$ Further, each peer node $RC_i$ in the $REF_{CMT}$ initializes a counter ($CTR_i$) where, the counter ($CTR_i$) is set to zero. This counter is set at the beginning of sharding committee reconfiguration with the following instructions code of the leader node (LR) as specified in Table 2 and computes,

TABLE 2

Generation of second message packet (M')

Parties. Nodes in REF_CMT = $\{RC_1 \ldots, RC_t\}$ moderated by LR node and a peer node P.
Goal. To enable Blockchain peer nodes to join sharding committees.
Set Up: Each node $RC_i$ in REF_CMT initialized counter $CTR_i$ to $0 \leftarrow CTR_i$. This is done only once at the beginning of committee reorganization following the instructions of LR node.
Input: A message M = [IP Address, HASH($pk_p$)] received by LR node from a member node P.
The protocol:
M1. LR node assigns HASH($pk_p$) to one of member nodes $RC_i$ (of REF_CMT) in a randomly chosen way.
M2. $RC_i$ node extracts
T1 = Time Stamp corresponding to M when it started from P.
T2 = Time Stamp corresponding to M when it reached LR node.
M3. $RC_i$ node computers $0 \leftarrow F(T1||T2||CRTR_i||HASH(pk_p))$
M4. $RC_i$ updates $CTR_i + 1 \leftarrow CTR_i$
M5. $RC_i$ composes message M' = [θ, T1, T2, $CRT_i$, $pk_{RC_i}$] and sends it back to P The leader node (LR) assigns the message (M) to one member of the reference committee member ($RC_i$) from the $REF_{CMT}$ in a random way. Then, the reference committee member ($RC_i$) extracts, a time stamp $T_1$, corresponding to each first message packet (M) indicating the
start time from corresponding peer node to reach the leader node (LR),
a time stamp $T_2$, corresponding to message packet (M) indicating the reaching
time of (M) at the leader node (LR) of the reference committee (REF_CMT).

Then, a theta parameter (θ) is computed by the reference committee (REF_CMT) based on the time stamp $T_1$, the time stamp $T_2$, a counter value ($CTR_i$) of the reference committee member ($RC_i$) as specified below in the equation 2, $$\theta = F(T_1 || T_2 || CTR_i || \text{hash } (PK_p)) \quad (2)$$

Further, the counter ($CTR_i$) value of the reference committee member is incremented and the ($CTR_i$) value gets updated. Then, the second message packet (M') is generated based on the theta parameter (θ), the time stamp $T_1$, the time stamp $T_2$, the counter of the reference committee (REF_CMT) member and the public key of the reference committee (REF_CMT) member as represented below in equation 3, $$M' = [\theta, T_1, T_2, CTR_i, PK\_RC_i] \quad (3)$$

Further, the generated second message packet (M') is utilized to reconfigure the members of sharding committee.

In an embodiment, considering an example scenario, the random number directory (rPOOL) objective is to generate a set of publicly verifiable random numbers that can be utilized for reconfiguring each sharding committee SHARD_CMT among the plurality of sharding committee reconfiguration. This is performed where each peer node randomly generates $r_1, r_2, \ldots r_k$, to update the theta parameter. In order to secure the process, if (REF_CMT) peer nodes are authorized to generate $r_1, r_2, \ldots r_k$, there is possibility that malicious peer nodes can collude with peer nodes in the reference committee (REF_CMT) and manipulate the process to obtain a favorable output. In the proposed disclosure each peer to peer node works efficiently with the reference committee (REF_CMT) to generate random number indices $(r_1, r_2, r_3, \ldots r_{\_A})$. Further, the proposed disclosure ensures that it is computationally difficult for a malicious peer node to bias the process of committee reorganization depends on the theta parameter. However, computation of the theta parameter involves the time stamps and signatures of message senders, which makes it extremely difficult for malicious peer nodes to bias the process of committee reconfiguration.

Referring now to FIG. 5, in order to generate a response to the first message packet (M), and at step 210 of the method 200, the processor 104 is configured to compute, by each peer node among the plurality of peer nodes utilizing a sharding committee reconfiguration technique, a peer node qualifier parameter (y) based on a theta parameter (θ), a nonce and a hash ($PK_i$). The second message packet received by each peer node ($P_i$) extracts the theta parameter (θ) and verifies the theta parameter (θ) utilizing the public key of the reference committee member the time stamp $T_1$, the time stamp $T_2$, the counter of the reference committee (REF_CMT) member and the public key of the reference committee (REF_CMT) member as represented below in equation 4, $$\theta = F(T_1 \| T_2 \| CTR_i \| hash(PK_i)) \quad (4)$$

Further, each peer node ($P_i$) computes a random number indices ($r_k$) as mentioned below in equation 5, for $1 \leq k \leq \delta$ $r_k = \theta \bmod |rPOOL|$ $\theta \leftarrow \theta \ggg \beta$ and $k \leftarrow k+1$ \quad (5)

Using random number indices ($r_1, r_2, r_3, \ldots r_{\_A}$), as mentioned below in equation 6, $$\theta_k = rPOOL[r_k] \quad (6)$$

and then updates the theta parameter (θ) corresponding to the peer node as mentioned below in equation 7, $$\theta \leftarrow_1 \oplus \ldots + \oplus \theta_\delta \quad (7)$$

Further, the peer node qualifier (y) is computed which is the output of SHA256, the theta parameter (θ), the nonce and the hash ($PK_i$) as mentioned below in equation 8, $y < 2^{256-D}$ where, $$y = SHA256(nonce \| \theta \| hash(PK_i)) \quad (8)$$

In one embodiment, the implementation details, the blockchain network setting the distributed protocol need to optimize computations, communications to be scalable. In general, there is a tradeoff between communications and computations for a successful run of protocols. The implementations for the (rPOOL) and sharding committee reconfiguration are measured with its performance. The experiments are executed on the system with a 8 GB RAM, Intel I7 processor with 4 cores and each with processing frequency of 2.40 GHz. The communication among the sharding committee members is 25 implemented using the RabbitMQ message broker. The code base and crypto APIs are developed in Python3 language. In sharding committee reconfiguration technique, the peer nodes solve a proof of work for generating the hash value using SHA256 with leading three zeros in the hash value. Secondly the verifiable random function based on RSA algorithm with key size 2048. Table 3 presents experimental results considering the plurality of peer nodes (as in Column 1) and distributed them into the sharding committees with the help of the reference committee (REF_CMT) as given in Column 3.

TABLE 3

Experimental results

| No. of peer nodes | Number of sharding committees | Peer nodes distribution | Time for (rPOOL) in seconds | Time for sharding committee reconfiguration in seconds |
|---|---|---|---|---|
| 60 (20) | 2 | [22, 38] [36, 24] | 1 | 1 |
| 200 (20) | 4 | [32, 28] [52, 43, 53, 50] [49, 46, 48, 45] | 2 | 1 |
| 300 (40) | 4 | [50, 39, 49, 40] [76, 73, 71, 75] [80, 74, 72, 69] | 3 | 2 |
| 400 (40) | 4 | [70, 71, 69, 68] [99, 101, 98, 93] [95, 94, 100, 98] | 6 | 2 |
| 500 (40) | 4 | [100, 96, 96, 91] [125, 129, 123, 108] [128, 120, 115, 127] [118, 126, 120, 123] | 11 | 3 |

The timings shown in Column 4 and 5 are averages taken over multiple runs. Also, the total time taken by (rPOOL) depends on consensus algorithm used by underlying blockchain. The experiments conducted time taken by the sharding committee reconfiguration technique depends on the size of the reference committee (REF_CMT). The distribution of the peer node given in column 3 (chosen from the experiment outputs) indicating the approximate number of peers assigned to each sharding committee. These numbers need not add up to total number of peers (as in Column 1). The performed experiments observed that roughly 5%-10% of peer nodes do not complete the process due to various reasons such as communication failure, thread crash, unable to respond within time bound and thereof.

At step 212 of the method 200, the processor 104 is configured to reconfigure, each peer node among the plurality of peer nodes, implemented via one or more hardware processors, as members of each sharding committee based on the peer node qualifier parameter (y).

In an embodiment, considering example threat scenario referring here to FIG. 5,

1. If a peer node P among the plurality node is malicious, a malicious peer is acting alone can't deviate from proposed technique without being detected. The first input message packet (M) is signed by sender and as such peer node cannot alter or manipulate it. The peer node can repeat the sharding committee reconfiguration technique with different $pk_p$ until it obtains favourable output.
2. If the peer node and the member in the reference committee (REF_CMT) collude—assuming the input message packet (M) sent by the peer node is assigned to the member peer node in the reference committee and both the peer nodes collude with each other and attempts to obtain a favorable output. This is computationally difficult and also detectable because of following reasons,
   (a) The network time stamps $T_1$, $T_2$ as in (M) are unforgeable.
   (b) The counter value $CTR_i$ of every node in (REF_CMT) need to be consistent with time stamps.
      For example, if for two peer nodes $P_1$; $P_2$ suppose that $T_2(P_2) > T_2(P_1)$ then $CTR_i$ value used for peer node $P_2$ is has to be more than $CTR_i$ value used for the peer node $P_1$.
   (c) The messages M;M' as well as values of nonce; y (as specified in R11) are all publicly available and can be verified by anyone.

Further, the computations for generating the second message packet and the sharding committee reconfiguration technique invokes only predetermined HASH and VRF which keep them simple and easy to understand and implement and other standard security. In the second message packet generation, time stamps $T_1$; $T_2$ are measured precisely and combining this with ($CTR_i$) it becomes highly computationally difficult, even for peer node of (REF_CMT) to collude with any peer node and precompute value of for the particular peer node. Further, a VRF is selected in which the size of output is at least 256 bits. The values of the random number index (as in R9 refer now to FIG. 5) are always well defined. However, there is a chance that the updated value of the θ theta parameter (R11, refer now to FIG. 5) is zero if δ is even. For instance if δ=4 and and r1=r4; r2=r3 then this results in δ=0 when updated. To prevent such scenario, the method selects choose δ which is an odd positive integer.

The embodiments of present disclosure herein addresses an unresolved problem of securing peer nodes by reconfiguring sharding committees in the blockchain network. The disclosed system provides a robust model with highly efficient and accurate committee reconfiguration technique disabling free hand to malicious peers to obtain their favorable outcome. The proposed disclosure is secure and scalable with unbiasable and unpredictable output avoiding malicious peers. This method has a publicly verifiable random number generation and utilizes its random numbers as seed to distribute peer nodes into each sharding committee in the blockchain network.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for securing peer nodes in a blockchain network, the method comprising:
    initiating, via one or more hardware processors, by a reference committee (REF_CMT) implemented in a blockchain network, a broadcast message requesting each peer node among a plurality of peer nodes to generate a random number directory (rPOOL), comprising random numbers, utilizing a verifiable random number generator function (F), wherein the reference committee (REF_CMT) communicates with each peer node through a leader node (LR) elected by the reference committee (REF_CMT);
    initiating, via the one or more hardware processors by the reference committee (REF_CMT) to reconfigure members of each sharding committee among a plurality of sharding committees at a predefined interval of time determined by the reference committee (REF_CMT), wherein each sharding committee includes at least one peer node as member;
    receiving, via the one or more hardware processors, by the reference committee (REF_CMT), a first message packet (M) comprising unique identifiers corresponding to each peer node among the plurality of peer nodes through the leader node (LR);
    sending, via the one or more hardware processors, by the reference committee (REF_CMT), to each peer node among the plurality of peer nodes a second message packet (M') as a response to the first message packet (M), wherein, the second message packet is generated by the reference committee (REF_CMT) which enables each peer node of the blockchain network to join one of the sharding committee;
    computing, via the one or more hardware processors, by each peer node among the plurality of peer nodes, utilizing a sharding committee reconfiguration technique, a peer node qualifier parameter (y) based on a theta parameter ($\theta$), a nonce and a hash ($PK_i$), wherein the nonce is a random generated number used once, wherein computing the peer node qualifier parameter (y) by each peer node utilizing the sharding committee reconfiguration technique comprises:
        verifying, utilizing a public key of a reference committee (REF_CMT) member, the theta parameter ($\theta$), a time stamp ($T_1$), a time stamp ($T_2$), and a counter values of the reference committee (REF_CMT) member,
        computing, random number indices ($r_1, r_2, r_3, \ldots r_A$) using the theta parameter ($\theta$) and the random number directory (rPOOL),
        computing, new values for the theta parameter ($\theta$) from the random number indices ($r_1, r_2, r_3, \ldots r_A$) of the random number directory and updating the theta parameter ($\theta$) of the corresponding peer node;
        computing, the peer node qualifier (y) using the theta parameter ($\theta$), the nonce and the hash ($PK_i$); and
    reconfiguring, via the one or more hardware processors, each peer node among the plurality of peer nodes, as member of a sharding committee based on the peer node qualifier parameter (y).

2. The method as claimed in claim 1, wherein generating the random number directory (rPOOL) utilizing the verifiable random number generator comprises:
    electing, by the reference committee (REF_CMT), the leader node (LR) as a communication interface between each peer node and the reference committee (REF_CMT), wherein the reference committee (REF_CMT) comprises randomly selected peer nodes;
    requesting, each peer node by the leader node (LR), to provide generated random numbers;
    receiving, by the leader node (LR), a response from each peer node comprising, the generated random numbers comprising an input ($x_i$), an output ($z_i$) and a proof ($\pi_i$) of a correctness of output, and a public key required to verify the proof ($\pi_i$) included in the response implicitly;
    collecting, by the leader node (LR), the generated random numbers;
    assigning, by the leader node (LR), each of the generated random numbers entry to each member of the reference committee (REF_CMT) for verification;
    obtaining, by the leader node (LR), from the members of the reference committee (REF_CMT), positively verified random numbers with a valid proof; and
    determining, utilizing a consensus protocol to store the positively verified random numbers into the random number directory of each peer node and with the members of the reference committee (REF_CMT) in the blockchain network.

3. The method as claimed in claim 1, wherein generating the second message packet by the reference committee (REF_CMT) comprises:
    obtaining a size of random number directory, the plurality of sharding committees identified using a logarithmic value integer and a positive integer for setting difficulty level of the peer node qualifier parameter (y);
    extracting, the time stamp ($T_1$) of each first message packet (M) indicating a start time from corresponding peer node to reach the leader node (LR), and the time stamp ($T_2$) of the first message packet (M) indicating its reaching time from corresponding peer node to the leader node (LR);
    computing, the theta parameter ($\theta$), based on the verifiable function (F), the time stamp $T_1$, the time stamp $T_2$, the counter values of the reference committee (REF_CMT) member, and the public key of the reference committee (REF_CMT) member utilizing the verifiable function (F);
    incrementing, the counter of the reference committee (REF_CMT) member and updating the counter; and
    generating, the second message packet comprising the theta parameter ($\theta$), the time stamp ($T_1$), the time stamp ($T_2$), the counter of the reference committee (REF_CMT) member and the public key of the reference committee (REF_CMT) member.

4. The method as claimed in claim 1, wherein each sharding committee comprises reconfigured members as peer nodes in the blockchain network.

5. The method as claimed in claim 1, wherein the predefined interval of time is defined based on a security parameter of the corresponding blockchain network.

6. A system for securing peer nodes in a blockchain network comprising:
  memory storing instructions;
  one or more communication interfaces; and
  one or more hardware processors coupled to the memory via the one or more communication interfaces, wherein the one or more hardware processors are configured by the instructions to:
    initiate, by a reference committee (REF_CMT) in a blockchain network, a broadcast message requesting each peer node among a plurality of peer nodes to generate a random number directory (rPOOL) comprising random numbers utilizing a verifiable random number generator function (F), wherein the reference committee (REF_CMT) communicates with each peer node through a leader node (LR) elected by the reference committee (REF_CMT);
    initiate, by the reference committee (REF_CMT) to reconfigure members of each sharding committee among a plurality of sharding committees at a predefined interval of time determined by the reference committee (REF_CMT), wherein each sharding committee includes at least one peer node as member;
    receive, by the reference committee (REF_CMT), a first message packet (M) comprising unique identifiers corresponding to each peer node among the plurality of peer nodes through the leader node (LR);
    send, by the reference committee (REF_CMT), to each peer node among the plurality of peer nodes, a second message packet (M') as a response to the first message packet (M), wherein, the second message packet is generated by the reference committee (REF_CMT) which enables each peer node of the blockchain blockchain network to join one of the sharding committee;
    compute, by each peer node among the plurality of peer nodes, utilizing a sharding committee reconfiguration technique, a peer node qualifier parameter (y) based on the theta parameter ($\theta$), a nonce and a hash ($PK_i$), wherein the nonce is a random generated number used once, and wherein computing the peer node qualifier parameter (y) by each peer node utilizing the sharding committee reconfiguration technique comprises:
      verifying, utilizing a public key of a reference committee (REF_CMT) member, the theta parameter ($\theta$), a time stamp ($T_1$), a time stamp ($T_2$), and a counter values of the reference committee (REF_CMT) member,
      computing, a random number indices ($r_1, r_2, r_3, \ldots r_A$) using the theta parameter ($\theta$) and the random number directory (rPOOL), and
      computing, new values for the theta parameter ($\theta$) from the random number indices ($r_1, r_2, r_3, \ldots r_A$) of the random number directory and updating the theta parameter ($\theta$) of the corresponding peer node; and
      computing, the peer node qualifier (y) using the theta parameter ($\theta$), the nonce and the hash ($PK_i$); and
    reconfigure, each peer node among the plurality of peer nodes, as members of a sharding committee based on the peer node qualifier parameter (y).

7. The system claimed in claim 6, wherein generating the random number directory (rPOOL) utilizing a verifiable random number generator, the one or more hardware processors are further configured by the instructions to:
  electing, by the reference committee (REF_CMT), the leader node (LR) as a communication interface between each peer node and the reference committee (REF_CMT), wherein the reference committee (REF_CMT) comprises randomly selected peer nodes;
  requesting, each peer node by the leader node (LR), to provide generated random numbers;
  receiving, by the leader node (LR), a response from each peer node comprising, the generated random numbers comprising an input ($x_i$) an output ($z_i$) and a proof ($\pi_i$) of a correctness of output and a public key required to verify the proof ($\pi_i$) is included in the response implicitly;
  collecting, by the leader node (LR), the generated random numbers;
  assigning, by the leader node (LR), each of the generated random numbers entry to each member of the reference committee (REF_CMT) for verification;
  obtaining, by the leader node (LR) from the members of the reference committee (REF_CMT), positively verified random numbers with valid proof; and
  determining, utilizing a consensus protocol to store the positively verified random numbers into the random number directory of each peer node and with the members of the reference committee (REF_CMT) in the blockchain network.

8. The system claimed in claim 6, wherein generating the second message packet by the reference committee (REF_CMT), the one or more hardware processors are further configured by the instructions comprises:
  obtaining a size of random number directory, the plurality of sharding committees identified using a logarithmic value integer and a positive integer for setting difficulty level of the peer node qualifier parameter (y);
  extracting, the time stamp ($T_1$) of each first message packet (M) indicating a start time from corresponding peer node to reach the leader node (LR), and the time stamp ($T_2$) of the first message packet (M) indicating its reaching time from corresponding peer node to the leader node (LR);
  computing, the theta parameter ($\theta$), based on the verifiable function (F), the time stamp $T_1$, the time stamp $T_2$, the counter values of the reference committee (REF_CMT) member, and the public key of the reference committee (REF_CMT) member utilizing the verifiable function (F);
  incrementing, the counter of the reference committee (REF_CMT) member and updating the counter; and
  generating, the second message packet comprising the theta parameter ($\theta$), the time stamp ($T_1$), the time stamp ($T_2$), the counter of the reference committee (REF_CMT) member and the public key of the reference committee (REF_CMT) member.

9. The system claimed in claim 6, wherein the one or more hardware processors are further configured by the instructions where each sharding committee comprises reconfigured members as peer nodes in the blockchain network.

10. The system claimed in claim 6, wherein the one or more hardware processors are further configured by the instructions, where the predefined interval of time is defined based on the security parameter of the corresponding blockchain network.

11. One or more non-transitory machine-readable information storage mediums comprising one or more instructions which when executed by one or more hardware processors perform actions comprising:

initiating, by a reference committee (REF_CMT) implemented in a blockchain network, a broadcast message requesting each peer node among a plurality of peer nodes to generate a random number directory (rPOOL), comprising random numbers, utilizing a verifiable random number generator function (F), wherein the reference committee (REF_CMT) communicates with each peer node through a leader node (LR) elected by the reference committee (REF_CMT);

initiating, by the reference committee (REF_CMT) to reconfigure members of each sharding committee among a plurality of sharding committees at a predefined intervals of time determined by the reference committee (REF_CMT), wherein each sharding committee includes at least one peer node as member;

receiving, by the reference committee (REF_CMT), a first message packet (M) comprising unique identifiers corresponding to each peer node among the plurality of peer nodes through the leader node (LR);

sending, by the reference committee (REF_CMT), to each peer node among the plurality of peer nodes a second message packet (M') as a response to the first message packet (M), wherein, the second message packet is generated by the reference committee (REF_CMT) which enables each peer node of the blockchain network to join one of the sharding committee;

computing, by each peer node among the plurality of peer nodes, utilizing a sharding committee reconfiguration technique, a peer node qualifier parameter (y) based on the theta parameter ($\theta$), a nonce and a hash ($PK_i$), wherein the nonce is a random generated number used once, and wherein computing the peer node qualifier parameter (y) by each peer node utilizing the sharding committee reconfiguration technique comprises:

verifying, utilizing a public key of a reference committee (REF_CMT) member, the theta parameter ($\theta$), a time stamp ($T_1$), a time stamp ($T_2$), and a counter values of the reference committee (REF_CMT) member, computing, a random number indices ($r_1, r_2, r_3, \ldots r_A$) using the theta parameter ($\theta$) and the random number directory (rPOOL), and computing, new values for the theta parameter ($\theta$) from the random number indices ($r_1, r_2, r_3, \ldots r_A$) of the random number directory and updating the theta parameter ($\theta$) of the corresponding peer node;

computing, the peer node qualifier (y) using the theta parameter ($\theta$), the nonce and the hash ($PK_i$); and reconfiguring, each peer node among the plurality of peer nodes, as member of a sharding committee based on the peer node qualifier parameter (y).

12. The one or more non-transitory machine-readable information storage mediums of claim 11, wherein generating the random number directory (rPOOL) utilizing a verifiable random number generator, the one or more hardware processors are further configured by the instructions to:

electing, by the reference committee (REF_CMT), the leader node (LR) as a communication interface between each peer node and the reference committee (REF_CMT), wherein the reference committee (REF_CMT) comprises randomly selected peer nodes as;

requesting, each peer node by the leader node (LR), to provide generated random numbers;

receiving, by the leader node (LR), a response from each peer node comprising, the generated random numbers comprising an input ($x_i$) an output ($z_i$) and a proof ($\pi_i$) of a correctness of output and a public key required to verify the proof ($\pi_i$) is included in the response implicitly;

collecting, by the leader node (LR), the generated random numbers;

assigning, by the leader node (LR), each of the generated random numbers entry to each member of the reference committee (REF_CMT) for verification;

obtaining, by the leader node (LR) from the members of the reference committee (REF_CMT), positively verified random numbers with valid proof; and determining, utilizing a consensus protocol to store the positively verified random numbers into the random number directory of each peer node and with the members of the reference committee (REF_CMT) in the blockchain network.

13. The one or more non-transitory machine-readable information storage mediums of claim 11, wherein the one or more hardware processors are further configured by the instructions where each sharding committee comprises reconfigured members as peer nodes in the blockchain network.

14. The one or more non-transitory machine-readable information storage mediums of claim 11, wherein the one or more hardware processors are further configured by the instructions, where the predefined interval of time is defined on a security parameter of the corresponding blockchain network.

* * * * *